United States Patent
Yang et al.

(10) Patent No.: US 9,943,206 B2
(45) Date of Patent: Apr. 17, 2018

(54) ROBOT CLEANER, INFORMATION PROVIDING SYSTEM, AND METHOD FOR PROVIDING INFORMATION

(71) Applicant: Samsung Electronics Co., Ltd., Gyeonggi-do (KR)

(72) Inventors: Hee-kyung Yang, Gyeonggi-do (KR); Ji Eom, Gyeonggi-do (KR); Ji-hye Jang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/167,862

(22) Filed: May 27, 2016

(65) Prior Publication Data

US 2016/0374526 A1 Dec. 29, 2016

(30) Foreign Application Priority Data

Jun. 26, 2015 (KR) .................. 10-2015-0091192

(51) Int. Cl.
*A47L 11/40* (2006.01)
*H04W 4/00* (2018.01)
(Continued)

(52) U.S. Cl.
CPC ......... *A47L 11/4011* (2013.01); *A47L 9/2857* (2013.01); *A47L 11/4013* (2013.01);
(Continued)

(58) Field of Classification Search
CPC .............. A47L 11/4011; A47L 9/2857; A47L 2201/00; A47L 2201/06; G05D 1/0088;
(Continued)

(56) References Cited

U.S. PATENT DOCUMENTS

| | | | |
|---|---|---|---|
| 6,389,329 B1 * | 5/2002 | Colens | ...................... A47L 5/30 180/167 |
| 6,532,404 B2 * | 3/2003 | Colens | ................ A47L 11/4005 180/167 |

(Continued)

FOREIGN PATENT DOCUMENTS

| | | |
|---|---|---|
| EP | 2886032 A1 | 6/2015 |
| JP | 2013-242738 | 12/2013 |

(Continued)

OTHER PUBLICATIONS

Kim et al., Kim et al., Wireless lithium-ion battery charging platform with adaptive multi-phase rapid-charging strategy, 2015, IEEE, p. 3087-3091.*

(Continued)

*Primary Examiner* — McDieunel Marc

(57) ABSTRACT

A robot cleaner is provided. The robot cleaner includes a communication unit configured to communicate with the robot cleaner using a near field wireless communication (NFC) and a processor configured to detect a state of the robot cleaner among a plurality of predefined states. The processor is also configured to, in response to NFC tagging being performed with the mobile terminal, control the communication unit to transmit information corresponding to the detected state to the mobile terminal.

20 Claims, 18 Drawing Sheets

(51) Int. Cl.
*G05D 1/00* (2006.01)
*A47L 9/28* (2006.01)

(52) U.S. Cl.
CPC ......... *G05D 1/0022* (2013.01); *G05D 1/0088* (2013.01); *H04W 4/008* (2013.01); *A47L 2201/00* (2013.01); *A47L 2201/06* (2013.01); *G05D 2201/0203* (2013.01)

(58) Field of Classification Search
CPC ........ G05D 1/0022; G05D 2201/0203; H04W 4/008
USPC .................. 700/90, 245, 275; 318/568.1
See application file for complete search history.

(56) References Cited

U.S. PATENT DOCUMENTS

| | | | |
|---|---|---|---|
| 6,748,297 B2* | 6/2004 | Song | A47L 9/2805 15/319 |
| 7,031,805 B2* | 4/2006 | Lee | B60L 11/1833 700/245 |
| 7,133,746 B2* | 11/2006 | Abramson | G05D 1/0225 318/568.1 |
| 7,620,476 B2* | 11/2009 | Morse | A47L 5/14 15/319 |
| 2013/0060379 A1 | 3/2013 | Choe et al. | |
| 2014/0087660 A1 | 3/2014 | Kim et al. | |
| 2014/0087661 A1 | 3/2014 | Kim et al. | |
| 2014/0096030 A1 | 4/2014 | Hashiura et al. | |
| 2015/0120015 A1* | 4/2015 | Fadell | G08B 19/005 700/90 |
| 2015/0156030 A1* | 6/2015 | Fadell | H04L 12/2816 700/90 |
| 2015/0178067 A1 | 6/2015 | Ji | |
| 2015/0212500 A1* | 7/2015 | Akabane | G05D 1/0274 700/275 |
| 2015/0370272 A1* | 12/2015 | Reddy | G05B 15/02 700/278 |
| 2015/0372832 A1* | 12/2015 | Kortz | G05B 15/02 700/278 |
| 2015/0375395 A1* | 12/2015 | Kwon | A47L 9/2857 700/245 |
| 2016/0195856 A1* | 7/2016 | Spero | G06N 5/046 700/90 |

FOREIGN PATENT DOCUMENTS

| | | |
|---|---|---|
| JP | 2014-030105 | 2/2014 |
| JP | 2014-075045 | 4/2014 |
| JP | 2014-098962 | 5/2014 |
| JP | 2014-144514 | 8/2014 |
| KR | 10-0846447 | 7/2008 |
| KR | 10-2013-0029852 | 3/2013 |
| KR | 10-2014-0043652 | 4/2014 |

OTHER PUBLICATIONS

Nakamura et al., Prototype system for energy management of mobile device via wireless charging robot, 2016, IEEE, p. 727-432.*

European Patent Office, "European Search Report," Application No. 16170598.3-1802, dated Nov. 22, 2016, 10 pages, publisher EPO, Munich, Germany.

Communication from a foreign patent office in a counterpart foreign application, Communication pursuant to Article 94(3) EPC, Application No. EP 16 170 598.3, dated Jan. 17, 2018, 6 pages.

* cited by examiner

1000

S910

S920

S930

S940

S950

S1230

```
┌─────────────────────────────┐
│ «  SAMSUNG SMART CLEANING ROBOT │
│                             │
│      DO YOU WANT TO         │
│       UPDATE F/W?           │
│                             │
│    ┌─────┐    ┌─────┐       │
│    │ YES │    │ NO  │       │
│    └─────┘    └─────┘       │
│  ─────────────────────────  │
│      F YOU PRESS 'YES',     │
│     IT WILL AUTOMATICALLY   │
│      RETURN TO CHARGING.    │
│                             │
└─────────────────────────────┘
```

S1210        S1220

⇩ S1240

S1260        S1250

S1410

S1420

S1430

« | SAMSUNG SMART CLEANING ROBOT

ERROR CODE C01

HOW TO

▶ AFTER TURNING OFF EMERGENCY SWITCH, PLEASE REMOVE FOREIGN SUBSTANCE FROM POWERBRUSH.

GO TO CUSTOMER SUPPORT

ROBOT CLEANER, INFORMATION PROVIDING SYSTEM, AND METHOD FOR PROVIDING INFORMATION

CROSS-REFERENCE TO RELATED APPLICATION(S) AND CLAIM OF PRIORITY

The present application is related to and claims priority from Korean Patent Application No. 10-2015-0091192, filed in the Korean Intellectual Property Office on Jun. 26, 2015, the disclosure of which is incorporated herein by reference in its entirety.

TECHNICAL FIELD

Apparatuses and methods consistent with aspects of one or more example embodiments relate to an information providing system including a robot cleaner and a mobile terminal and, more particularly, to an information providing system which provides information suitable for circumstances through a mobile terminal according to a state of a robot cleaner.

BACKGROUND

The development of robots has not only enabled a robot to be used in the professional academic field or an industry that requires a large amount of labor force, but also in a normal household.

In particular, a robot cleaner (or, a cleaning robot) is an apparatus which automatically cleans a cleaning area by sucking a foreign substance, such as dust on a surface to be cleaned, as it runs on an area to be cleaned by itself, which is a robot that is very popular and familiar to people in the market since it reduces time and effort put into chores of a user.

Conventionally, in order to work a robot cleaner, a user had to refer to a complicated user manual, and it was complicated and inconvenient to search and access information on handling errors of the robot cleaner that occur during use.

SUMMARY

To address the above-discussed deficiencies, it is a primary object to provide an information providing system which provides suitable information according to a state of a robot cleaner by means of a near field wireless communication functionality of a mobile terminal.

According to an embodiment, there is provided a robot cleaner including a communication unit configured to communicate with a mobile terminal by a near field wireless communication (NFC) and a processor configured to detect a state of the robot cleaner among a plurality of predefined states, and in response to an NFC tagging being performed with a mobile terminal, control the communication unit to transmit information including the detected state to the mobile terminal.

In this situation, the processor may be configured to control the communication unit to transmit information on an application exclusive for the robot cleaner.

The processor may be configured to update a firmware thereof to a new firmware received from the mobile terminal.

The processor may be configured to control the communication unit to transmit at least one of state information of a dust bin which collects dust, state information of a filter which filters dust in inhaled air, and state information of charging of a battery, to the user terminal.

The processor may be configured to control the communication unit to transmit address information of a webpage which provides customer support information regarding errors in the robot cleaner, to the user terminal.

The processor may be configured to control the communication unit to transmit different information according to information received from the mobile terminal.

In this situation, the processor may be configured to, in response to receiving information indicating that a user of the mobile terminal has not left the house yet from the user terminal, control the communication unit to transmit cleaning reservation information set in the robot cleaner, and in response to receiving information indicating that the user of the mobile terminal came back home from the user terminal, control the communication unit to transmit cleaning history information.

The robot cleaner may further include a dust sensor which detects a concentration of inhaled dust, and the processor may be configured to control the communication unit to transmit information on a dust concentration of a space cleaned.

According to another aspect of the present disclosure, an information providing system may include a robot cleaner having an NFC module and a mobile terminal configured to communicate with the robot cleaner by a near field wireless communication by NFC tagging the robot cleaner, and the robot cleaner may be configured to detect a state of the robot cleaner among a plurality of predefined states, and display a screen which provides information corresponding to the detected state of the robot cleaner.

In this situation, the mobile terminal may be configured to determine whether the user has left the house based on location information which positions the mobile terminal, in response to determining that the user has not yet left the house, display a reservation setting screen to reserve cleaning by the robot cleaner, and in response to determining that the user has returned home, display cleaning history information of the robot cleaner.

The mobile terminal may be configured to display the reservation setting screen for defining an area to be cleaned and cleaning history information which differs by area, by means of map information of an interior in which the robot cleaner is disposed.

According to another aspect of the present disclosure, a method for providing information of a robot cleaner includes detecting a state of the robot cleaner among a plurality of predefined states and in response to an NFC tagging being performed with a mobile terminal, transmitting information corresponding to the detected state to the mobile terminal.

The transmitting may include transmitting information on an application exclusive for the robot cleaner.

The information providing method may further include receiving a new firmware from the mobile terminal and updating a firmware installed in the robot cleaner by means of the received new firmware.

The transmitting may include transmitting, to the user terminal, at least one of state information of a dust bin which collects dust, state information of a filter which filters dust from inhaled air, and state information of charging of battery.

The transmitting may include transmitting address information of a webpage which provides customer support information regarding errors in the robot cleaner.

The transmitting may include different information according to information received from the mobile terminal.

The transmitting may include, in response to receiving, from the mobile terminal, information indicating that a user of the mobile terminal has not yet left the house, transmitting cleaning reservation information set in the robot cleaner to the user terminal, and in response to receiving, from the mobile terminal, information indicating that the user of the mobile terminal has returned home, transmitting cleaning history information.

The information providing method may further include detecting a concentration of inhaled dust, and the transmitting may include transmitting information on a dust concentration of an area cleaned.

According to the various aspects of the present disclosure, the present disclosure may provide useful information according to a context of a robot cleaner by means of a mobile terminal that is familiar to a user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, the present disclosure will be described in detail with reference to the accompanying drawings.

Figure 1:
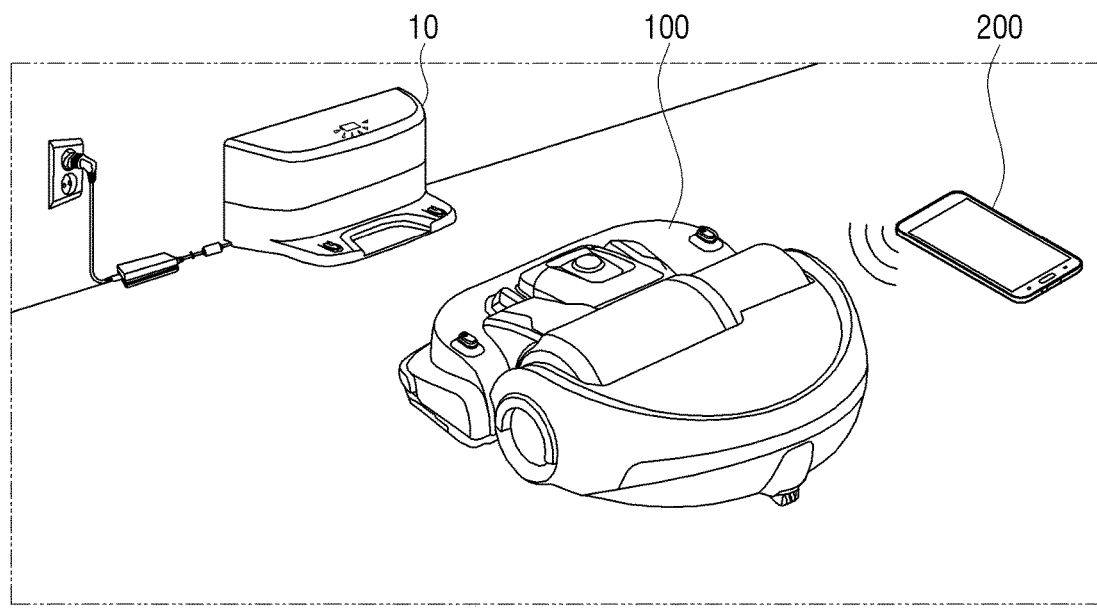
FIG. 1 is a view illustrating an information providing system according to an embodiment.

FIG. 1 is a view illustrating an information providing system according to an embodiment.

Referring to FIG. 1, an information providing system 1000 includes a robot cleaner 100 and a mobile terminal 200. Also, FIG. 1 additionally illustrates a battery charging device 10.

The robot cleaner 100 is configured to clean a surface of the interior in which it is installed. For example, the robot cleaner 100 may be installed in the interior of a house, and the robot cleaner 100 may inhale air as it moves according to a preset pattern or a command defined or input by a user, to thereby collect dust around the surface to be cleaned.

The robot cleaner 100 is configured to receive power supply from the battery charging device 10. Specifically, the robot cleaner 100 may be configured to receive power supply by electrically bonding with the battery charging device 10 in order to charge a built-in battery. The battery charging device 10 may be configured to output a wireless signal (e.g. infrared light) to inform its location to the robot cleaner 100. The robot cleaner 100 may be configured to return to a place in which the battery charging device 10 is installed, in response to a preset event occurring, such as a back to charge command, a cleaning finish command, or that a charge amount of a built-in battery reaches, or falls below, a predetermined threshold value.

The robot cleaner is configured to communicate with the mobile terminal by a near field wireless communication. Specifically, the robot cleaner 100 may be configured to communicate with the mobile terminal by a near field wireless communication by means of a near field communication (NFC) method. An NFC refers to a non-contact type near field wireless communication method which uses a frequency band of 13.56 MHz. When an NFC technology is used, data may be transmitted and received when a plurality of devices approach close, such as approximately within 10 cm. In particular, according to an aspect of the present disclosure, an NFC communication may conform to a standard of ISO/IEC 18092 which supports bi-directional communication with a mobile terminal 200.

The mobile terminal 200 is a wireless communication electronic device which may be easily carried around by a user. For example, the mobile terminal 200 may be a cell phone, a PDA, a laptop, a digital camera, a game machine, an electronic book, and the like.

The mobile terminal 200 is configured to support a near field communication corresponding to a near field communication of the robot cleaner 100. Specifically, the mobile terminal 200 may be configured to perform a near field wireless communication using an NFC method.

The robot cleaner 100 may be in various states. For example, the robot cleaner 100 may be in a standby state where it does not perform any operation, a cleaning state, or a state where its battery is being charged by the charger 10.

The mobile terminal 200 may be configured to perform NFC tagging with the robot cleaner 100.

The NFC tagging refers to an action of two devices which support NFC communication are approaching within a scope of distance that NFC communication is possible.

The robot cleaner 100 may be configured to continuously detect a state of its own, and transmit information corresponding to the detected state to the NFC-tagged mobile terminal 200 via a near field wireless communication. For example, when an NFC tagging is performed with a stopped robot cleaner 100, the mobile terminal 200 may receive information indicating that the robot cleaner 100 is in a standby state and that a cleaning reservation is needed, or may receive information indicating the robot cleaner 100 is inoperable and solutions to the relevant errors. Example embodiments regarding more detailed context will be described, taken in conjunction with the drawings.

According to an aspect of the present disclosure, the information providing system 100 may improve a user convenience in using the robot cleaner 100 in view of the context according to a state of the robot cleaner 100 and the mobile terminal 200.

Figure 2:
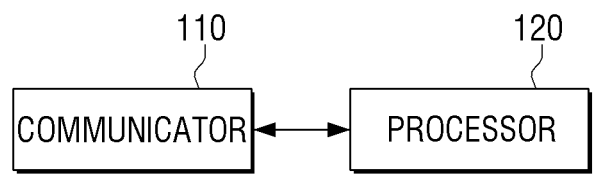
FIG. 2 is a block diagram illustrating a configuration of a robot cleaner according to an embodiment.

FIG. 2 is a block diagram illustrating a configuration of a robot cleaner according to an embodiment.

Referring to FIG. 2, the robot cleaner 100 includes a communication unit 110 and a processor 120.

The processor 120 is configured to perform a near field communication. Specifically, the communication unit 110 may be configured to perform a NFC communication. In an embodiment, the communication unit 110 may include an NFC module.

An NFC module may include an integrated circuit (IC) and an antenna coil. The NFC module may be configured to perform as both an NFC leader and an NFC tag. In addition, the aforementioned integrated circuit may include an NFC processor chip and an NFC USIM.

When the robot cleaner 100 is an initiator of NFC communication, the communication unit 110 is configured to form an RF field through an antenna coil. In other words, when the NFC module of the robot cleaner 100 performs as an NFC leader, an electromagnetic field is formed in the antenna coil.

Alternatively, when the robot cleaner 100 is a target of NFC communication, the communication unit 110 is configured to receive a signal of the RF field. That is, when the NFC module of the robot cleaner 100 performs as a NFC tag, an inductive current is generated and a signal is input by the electromagnetic field formed around the antenna coil.

The communication unit 110 may generate an RF signal according to predetermined modulation technique and coding scheme from among various types of modulation techniques and coding schemes. A modulation refers to a technique which changes an amplitude, frequency, phase, and the like, of an RF carrier signal exchanged between two or more NFC modules, to thereby load data. The modulation may use an amplitude shift keying (ASK) technique, a frequency shift keying (FSK) technique, a phase shift keying (PSK) technique, and the like. The ASK method is a method which shifts an amplitude of a carrier signal according to whether an information signal in a digital format is 0 or 1. For example, when an information signal is 0, the amplitude of a return signal is reduced, and when the information signal is 1, the amplitude is increased and transmitted. When amplitude of two stages is used, one byte may be transmitted, but when different amplitudes of four stages are used, two bits may be transmitted at the same time. The FSK scheme is a method which respectively allocates digital signals, 0 and 1 bit, to two types of frequencies (low frequency, high frequency) and transmits the same. For example, when an information signal is 0, a frequency lower than a return frequency is generated, and when an information signal is 1, a frequency higher than a return frequency is generated and transmitted. The PSK scheme is a method which changes a phase of a return carrier according to data to be transmitted. A change amount of the phase is determined by the data. When the data to be transmitted is 0, a phase of return carrier is changed by 180 degrees, and when the data to be transmitted is 1, the phase of a return carrier is changed by 90 degrees and information is transmitted one by one by bite.

In addition, a Modified Miller coding scheme and a Manchester coding scheme may be used.

According to an aspect of the present disclosure, a modulation technology and a coding scheme to be used by the communication unit 110 may be set appropriately in view of a type and communication speed of a device. For example, when the communication unit 110 does not have a battery and is a passive type that is driven by a current induced by an electromagnetic wave released from a near field wireless communication leader, the ASK technology and the Manchester coding scheme may be used. Alternatively, when the communication unit 110 has its own power supply and is an active type which communicates with an external near field wireless communication leader, the ASK and Modified Miller coding scheme may be used in a speed of 106 kbps, and the ASK and Manchester coding scheme may be used in a speed of 212 kbps and 424 kbps.

The processor 120 is configured to control each of features of the robot cleaner 100. Specifically, the processor 120 may be configured to control an operation and function of the robot cleaner 100. In addition, the processor 120 may be configured to detect a state of the robot cleaner 100, and generate information on the detected state.

More specifically, the processor 120 may be configured to detect at least one state that corresponds to the robot cleaner 100 from among a plurality of predefined states. In this example, state information regarding a predefined state may be stored in an internal storage of the robot cleaner 100. In addition, state information may be stored pre-stored by manufacturer at the time of initial production of the product, or new state information may be added through update after the product is produced. The robot cleaner 100 may be configured to continuously track its state.

The processor 120 may be configured to detect NFC tagging of the mobile terminal 200. Specifically, the processor 120 may be configured to detect that an NFC tagging has been performed with respect to the robot cleaner 100.

The processor 120 may control the communication unit 110 to transmit information corresponding to a detected state to the mobile terminal 200 via a near field wireless communication. Specifically, when an NFC tagging is performed by the mobile terminal 200, the processor 120 may be configured to control the communication unit 110 to transmit information to the mobile terminal 200 via NFC.

In this example, transmission of information may use both the aforementioned active type and passive type. That is, when the mobile terminal 200 acts as a leader, information may be transmitted by reading information recorded on the robot cleaner 100. Alternatively, information may be transmitted to the mobile terminal 200 by an RF signal formed by the robot cleaner 100.

In this example, the corresponding transmitted information may include not only state information indicating a state but also various information related to states. In other words, the processor 120 may be configured to control the communication unit 110 to only transmit state information regarding a detected state to the mobile terminal 200 via the communication unit 110. Alternatively, the processor 120 may be configured to control the communication unit 110 to transmit additional information relevant to a detected state to the mobile terminal 200 via the communication unit 110.

The processor 120 may be realized in a plurality of various methods. For example, the processor 120 may, for example, be at least one of a processor, an application specific integrated circuit (ASIC), an embedded processor, a microprocessor, a hardware control logic, a hardware finite state machine (FSM), and a digital signal processor (DSP). Although not illustrated, a control interface may be used for communication between the processor 120 and other functional units within the robot cleaner 100. In addition, the control interface may be used for external communication of the robot cleaner 100. The processor 120 may be realized as one chip including a function of an NFC processor chip described above, and may be realized as an additional processor connected to the control interface.

With regard to various aspects of the present disclosure, information exchanged with the mobile terminal 200 via the communication unit 110, state of the robot cleaner 100 detected by the processor 120, and information provided to correspond to the detected state will be described below, taken in conjunction with FIGS. 7 to 18.

Figure 3:
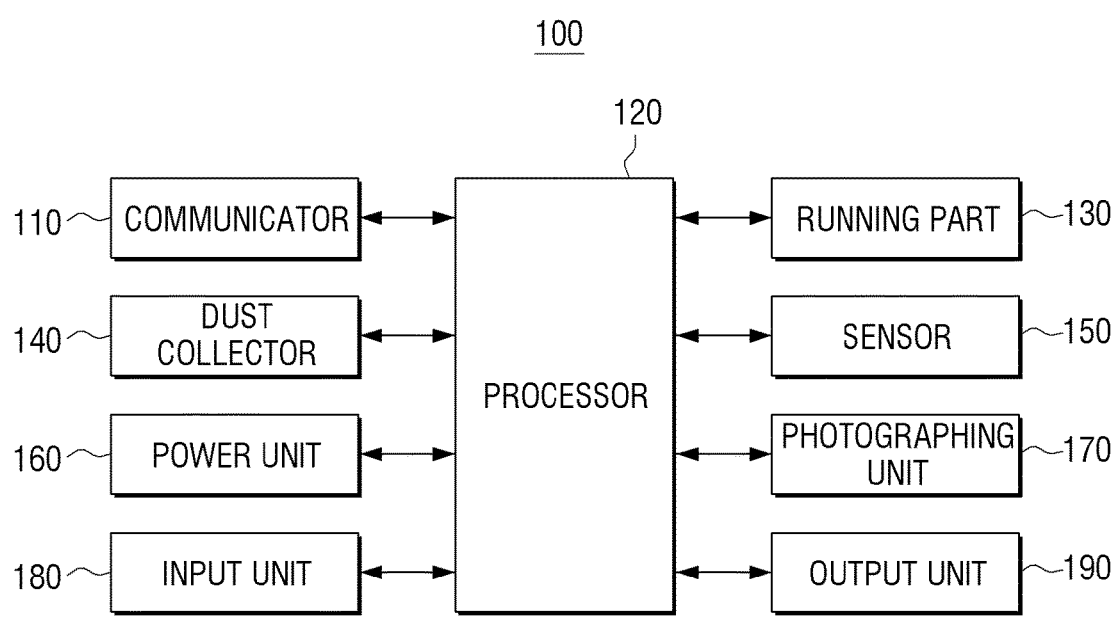
FIG. 3 is a block diagram illustrating a detailed configuration of the robot cleaner of FIG. 2.

FIG. 3 is a block diagram illustrating a detailed configuration of the robot cleaner of FIG. 2.

Referring to FIG. 3, the robot cleaner 100 includes a communication unit 110, a processor 120, a running part 130, a dust collector 140, a sensor 150, a power unit 160, a photographing unit 170, an input unit 180, and an output unit 190. In this example, an operation and function of the communication unit 110 are the same as or similar to those of the communication unit 110 of FIG. 2, the description thereof is omitted herein.

The running part 130 is configured to run the robot cleaner 100. Specifically, the running part 130 may be configured to displace the robot cleaner 100 to a place to be cleaned, by controlling of the processor 120. The running part 130 may include at least one wheel in contact with a floor surface, a motor which supplies power to the wheel, and a driver which controls the motor, or the like.

The dust collector 140 is configured to collect dust. Specifically, the dust collector 140 may be configured to inhale air, and collect dust in the inhaled air. The dust collector 140 may be configured to include a motor which passes air through a guide pipe that connects from an inlet to an outlet, a filter which filters dust from the inhaled air, and a dust bin which contains the filtered dust, or the like.

The sensor 150 is configured to detect an external environment of the robot cleaner and a state of the robot cleaner 100. Specifically, the sensor 150 may detect an external environment and its own state, in order to perform a cleaning function and information providing function of the robot cleaner 100.

The sensor 150 may include at least one obstacle sensor to detect an obstacle. The obstacle sensor may include a non-contact type detecting sensor to identify a wall, gap, pole, threshold, bump, and the like, through which the robot cleaner 10 cannot pass, and a contact type collision/bumper sensor.

The sensor 150 may include a dust sensor. Specifically, the sensor 150 may include a dust sensor to detect a concentration of dust inhaled through an inlet of the robot cleaner 100. The sensor 150 may be configured to detect a signal generated in the charging device placed at a remote distance, when the robot cleaner is back to charging.

The sensor 150 may include a human body detecting sensor which may recognize a human. For example, the sensor 150 may detect a change of infrared rays of a surrounding environment and generate a signal to determine that a person ahead is moving.

The sensor 150 may include a sensor to detect an internal state. For example, the sensor 150 may include a current sensor which detects an amount of dust collected in a dust bin, or which detects a load of a motor is increased due to a foreign substance stuck in a wheel, a sensor which detects over-charging of a battery, a sensor which detects a foreign substance of a sensor window from which a signal of sensors to detect an external environment is emitted, or the like.

The sensor 150 is not limited to the above-mentioned examples, and it may be added or changed as necessary and according to a design in various manners.

The power unit 160 supplies power necessary for driving the robot cleaner 100. The power unit 160 may be realized as a secondary battery (or, referred to as "battery") which can be charged or discharged.

The photographing unit 170 is configured to photograph an image. Specifically, the photographing unit 170 is configured to photograph an image outside the robot cleaner 100. The photographing unit 170 may include a ceiling camera. The ceiling camera is configured to generate image data which serves as a reference to track a position to which the robot cleaner 100 is moved.

The photographing unit 170 may include a front camera. The front camera may be configured to photograph an object in front of the robot cleaner 100. The photographed front image may be used to avoid an obstacle on a path on which the robot cleaner 100 moves and calculate an optimized moving path, or to monitor an interior of the house.

The input unit 180 is configured receive input of various user operations to control the robot cleaner 100. Specifically, the input unit 180 may include a button member or a touch sensing element which receives a user input.

In addition, the input unit 180 may include a remote processor which may perform remote control. According to another aspect of the present disclosure, the input unit 180 may include a microphone which collects sounds to recognize a user uttered voice and control the robot cleaner.

The output unit 190 is configured to output information provided to a user. For example, the output unit 190 may include a display which displays a screen. In this example, the display may be realized such that it is combined with a touch sensor and receives a user operation on the displayed screen.

The output unit 190 may include a speaker to output sound. A source of a sound output by the speaker may, for example, be audio data pre-stored in the robot cleaner 100.

For example, the pre-stored audio data may be data for voice guide which corresponds to each function of the robot cleaner 100. According to an aspect of the present disclosure, the speaker may be configured to apply a TTS algorithm which converts record data recorded by a user, or text, to utterance and output audio which reproduces the data to which the user input text is converted.

The processor 120 is configured to control each of multiple configurations of the robot cleaner 100. For example, the processor 120 may be configured to move the robot cleaner 100 by controlling a motor of the running part 130, and detect a foreign substance stuck in a wheel by detecting a load of the motor.

The processor 120 may be configured to control a motor of the running part 130 and the dust collector 140 according to a cleaning mode. The cleaning mode may include an auto cleaning, a partial cleaning, a repeat cleaning, a manual cleaning, a quiet mode, and a turbo mode. The auto cleaning mode is a function which cleans an entire area to be cleaned one time; the partial cleaning is a function which partially cleans one area only; the repeated cleaning mode is a function which cleans repeatedly a cleaning area as long as the battery allows; the manual cleaning mode is a function in which a user manually performs cleaning using a remote processor, or the like; the quiet mode is a function which cleans with low noise; and the turbo mode is a function which increases output of a motor of the dust collector 140 for several minutes when a large amount of dust inflow is detected.

The processor 120 may be configured to determine at least one state of the robot cleaner 100 among a plurality of predetermined states, according to a signal detected from the sensor 150.

The processor 120 may be configured to detect a battery remaining amount of the power unit 160. When the power unit lacks battery, the processor 120 may be configured to control the running part 130 to return to charging. In this example, the "return to charging" refers to that the robot cleaner 100 moves to a position in which the charging device 10 is installed, and charges the battery.

The processor 120 may be configured to track a position of the robot cleaner 100 through an image being photographed in the photographing unit 170. The processor 120 may be configured to generate, from the tracked path, a map of an interior in which the robot cleaner 100 is disposed. Then, the processor 120 may control the communication unit to transmit the generated indoor map information to the mobile terminal 200. According to another aspect of the present disclosure, a map of the interior may be generated in the mobile terminal 200 and transmitted to the robot cleaner 100.

The processor 120 may be configured to perform a function according to a command corresponding to a user operation input to the input unit 180, and control each of the configurations. Then, the processor 120 may output information corresponding to a function performed in the output unit 190 and state information.

According to the aforementioned aspect of the present disclosure, the robot cleaner 100 may provide a further improved user convenience.

Figure 4:
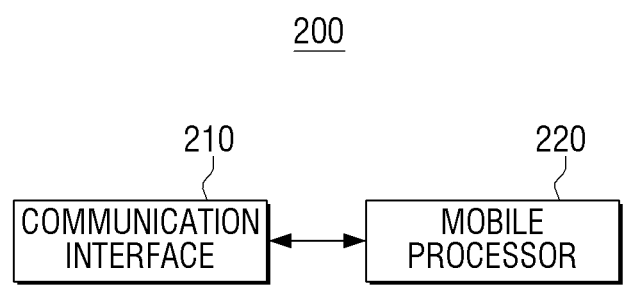
FIG. 4 is a block diagram illustrating a configuration of a mobile terminal according to an embodiment.

FIG. 4 is a block diagram illustrating a configuration of a mobile terminal according to an embodiment.

Referring to FIG. 4, the mobile terminal 200 includes a communication interface 210 and a mobile processor 220.

The communication interface 210 performs wired/wireless communication of various types. Specifically, the communication interface 210 may perform a near field wireless communication. In an embodiment, the communication interface 210 may include an NFC module corresponding to the communication unit 110 of FIG. 2. In addition, the communication interface 210 may further include a different communication module to support various communication methods. For example, the communication unit 140 may include at least one chip for Wifi, Bluetooth and wireless communication, and may access a LAN, the Internet, a CDMA, a GSM, an EPC, an LTE, a WiBRO, or the like.

The mobile processor 220 is configured to control each of configurations of the mobile terminal 200. Specifically, the mobile processor 220 may perform exchanging of information with the robot cleaner 100 through a near field wireless communication and perform computation and control to provide a user with information corresponding to a state of the robot cleaner.

The mobile processor 220 may be configured to provide a user with information acquired from the robot cleaner 100 in various methods. As an example embodiment, the mobile processor 220 may reflect data information received from the robot cleaner 100 directly on a displayed screen. For example, the mobile processor 220 may receive reservation information set in the robot cleaner 100 and display the received time and date information in a reservation information blank on the screen. As another example embodiment, the mobile processor 220 may be configured to only receive state information from the robot cleaner 100 and retrieve and output information corresponding to the received state information. For example, if the mobile processor 220 receives information indicating a particular error state from the robot cleaner 100, the mobile processor 220 may be configured to display a screen collecting information related to those errors to a user.

The mobile processor 220 includes a Read-Only Memory (ROM) which includes a control program to control a CPU and the mobile terminal 200 and a Random Access Memory (RAM) which remembers a signal or data input from the outside of the mobile terminal 200 or which is used as a memory area for an operation performed in the mobile terminal 200. The CPU may include at least one of a single core processor, a dual core processor, a triple core processor, and a quad core processor. The CPU, the ROM, and the RAM are connected to one another via an internal bus. The mobile processor 220 may further include a GPU for graphic processing and a temporary memory for improving parallel processing and reading/writing speed, or the like.

Figure 5:
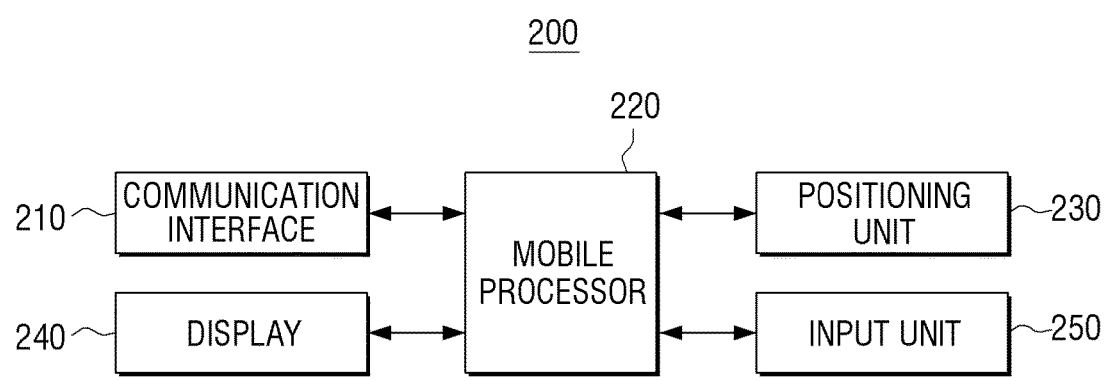
FIG. 5 is a block diagram illustrating a detailed configuration of the mobile terminal of FIG. 4.

FIG. 5 is a block diagram illustrating a detailed configuration of the mobile terminal of FIG. 4.

Referring to FIG. 5, the mobile terminal 200 includes the communication interface 210, the mobile processor 220, a positioning unit 230, a display 240, and an input unit 250. In this example, a configuration and operation of the communication interface 210 and the mobile processor 220 are the same as or similar to those of the communication interface 210 and mobile processor 220 of FIG. 4, and thus, the overlapping description will be omitted herein.

The positioning unit 230 is configured to measure a position of the mobile terminal 200. Specifically, the positioning unit 230 may be configured to receive a signal from an external source and measure a geographical position of the mobile terminal 200. As an example, the positioning unit 230 may receive a satellite signal from at least one of a global navigation satellite system (GNSS) satellite and a satellite based augmentation system (SBAS) satellite. In addition, the positioning unit 230 may further receive a position correction signal which carries an RTCM message for a Real Time Kinetic (RTK)-GPS system. The positioning unit 230 may measure a position of the mobile terminal 200 according to various positioning algorithms using the received at least one position.

The display 240 is configured to display a screen. Specifically, the display 240 may be configured to display a screen including information to be provided to a user. According to an example embodiment, the display 240 may be realized as at least one from among a liquid crystal display, a thin film transistor-liquid crystal display, an organic light-emitting diode, a flexible display, and a three dimensional (3D) display.

The input unit 250 is configured to receive a user operation. Specifically, the input unit 250 may be configured to receive a user operation corresponding to a command to control the mobile terminal 200. The input unit 250 may be realized as a button member, a touch panel to detect a touch input, a microphone to collect a user voice, and a motion detection sensor to detect a gesture input, or the like. In this example, the touch panel may be realized in the form of being combined with a display panel of the display 240 and receiving a touch input on a displayed screen.

The mobile processor 220 may be configured to receive whether a user has left the house, using position information of the mobile terminal received through the positioning unit 230. For example, the mobile processor 220 may be configured to determine that a user has not yet started a day and left the house, using pre-registered address information of the user.

The mobile processor 220 may be configured to control the communication unit to transmit information regarding whether a user has not yet left the house or the user has returned home, to the robot cleaner 100. Specifically, the mobile processor 220 may control the communication unit to transmit, to the robot cleaner 100, information indicating whether a user has left the house determined from a result of the measurement in the positioning unit 230. In addition, the mobile processor 220 may receive different information according to the transmitted information regarding a user's leaving the house from the robot cleaner 110 and display the received information on the display 240.

The mobile processor 220 may be configured to control the communication unit to transmit information input through the input unit 250, such as a cleaning reservation, setting, voice, text, to the robot cleaner 100. In addition, the mobile processor 220 may, in response to an NFC tagging being performed, automatically perform a procedure to change a current time set in the robot cleaner 100 to a current time set in the mobile terminal, even if no touch input is received.

The mobile processor 220 may be configured receive update information of a firmware installed in the robot cleaner 100. Specifically, the mobile processor 220 may receive information on a new firmware from an external server, such as a server provided by a robot cleaner manufacturer, or the like. Alternatively, the mobile processor 220 may retrieve appearance of a new firmware according to a preset cycle or when a preset event occurs.

The mobile processor 220 may be configured to execute an application exclusive for the robot cleaner 100. In addition, the mobile processor 220 may execute a web browser application capable of displaying a web page on the Internet.

According to another aspect of the present disclosure, the mobile processor 220 may generate a map of the interior where the robot cleaner 100 is disposed using a camera (not illustrated) included in the mobile terminal 200.

The mobile terminal 200 as described above may exchange information with the robot cleaner 100 and provide a user with information suitable for states of the robot cleaner 100 and the mobile terminal 200 in a flexible and familiar manner.

Figure 6:
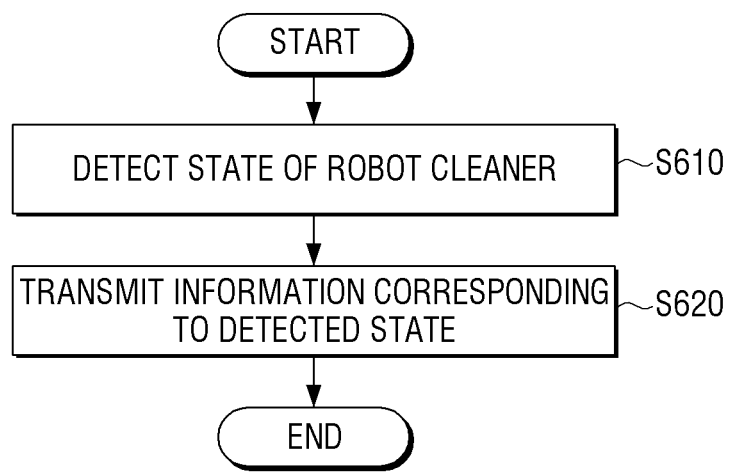
FIG. 6 is a flowchart illustrating a method for providing information of a robot cleaner according to an embodiment.

FIG. 6 is a flowchart illustrating an information providing method of the robot cleaner according to an embodiment.

Referring to FIG. 6, a state of the robot cleaner is configured to be detected first, in operation S610. Specifically, the robot cleaner may detect a state of the robot cleaner among a plurality of predefined states. In this example, the detecting may be performed constantly. In the same manner, the robot cleaner may detect the state constantly and generate accumulated state information. Alternatively, the detecting may be performed temporarily. In the same manner, the robot cleaner may respond to a detection of NFC tagging and inspect a state of the robot cleaner, and generate state information of the detected state.

Then, information corresponding to the detected state is transmitted, in operation S620. Specifically, the robot cleaner may transmit information corresponding to the detected state to a mobile terminal in response to NFC tagging being performed with respect to the mobile terminal.

The aforementioned information providing method may further include receiving information from a mobile terminal. In this example, information transmitted by the robot cleaner may differ depending on information received from the mobile terminal.

The information providing method of the robot cleaner as described above may appropriately provide information corresponding to a state of the robot cleaner through a mobile terminal familiar to a user solely by an NFC tagging operation.

In addition, the aforementioned information providing method may be realized as at least one execution program to execute the aforementioned information providing method, and this execution program may be stored on a computer readable storage medium.

Accordingly, each of the blocks of the present disclosure may be implemented as a computer recordable code on a computer readable storage medium. The computer readable storage medium may, for example, be a device capable of storing medium readable by a computer system.

For example, a computer readable storage medium may be a ROM, a RAM, a CD-ROM, a magnetic tape, a floppy disk, an optical disk, an optical data storage device, and an image display device including the storage device, such as a television, or the like. In addition, the computer readable code may be implemented as a computer data signal of a carrier.

Figure 7:
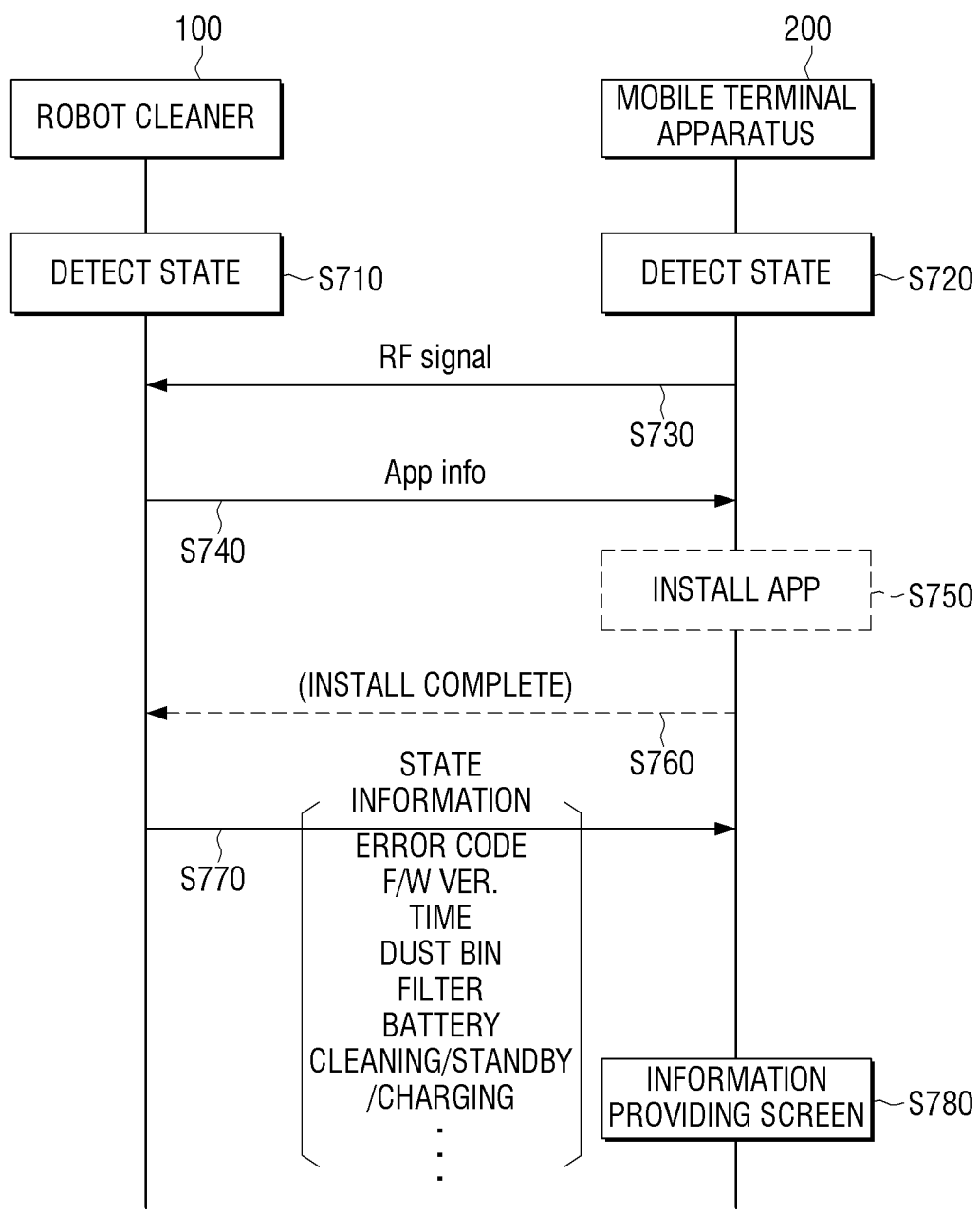
FIG. 7 is a flowchart illustrating an information providing method of an information providing system according to an embodiment.

FIG. 7 is a flowchart illustrating an information providing method of an information providing system according to an embodiment.

Referring to FIG. 7, the robot cleaner 100 and mobile terminal device 200 constituting the information providing system respectively detect a state, in operations S710 and S720. For example, the robot cleaner 100 may detect a state, such as a standby, cleaning, error, charging, and the like. In addition, the mobile terminal 200 may detect a state, such as update, out-of-the-house, and the like.

The mobile terminal 200 is configured to activate an NFC leader functionality to perform NFC tagging. The mobile terminal 200 in which the NFC leader functionality is activated may serve as an NFC initiator.

The mobile terminal 200 is configured to tag, in operation S730, an adjacent robot cleaner 100 by emitting an RF signal from an antenna coil.

The robot cleaner 100, which detected the NFC tagging of the mobile terminal 200, is configured to transmit information on an exclusive application to the mobile terminal 200. In this example, the transmitted application information may include a name of the application, a path through which the application is installed, address information on network in which the application is installable, and the like.

The mobile terminal 200 is configured to determine whether an exclusive application is installed, based on the received application information. When the application is not installed, the mobile terminal 200 may go through the step of installing the application, in operation S750.

The mobile terminal 200 may, when the application is installed, or pre-installed, transmit, in operation S760, information that the application is installed to the robot cleaner.

The robot cleaner 100 is configured to transmit, in operation S770, detected state information to the mobile terminal 200. In this example, the robot cleaner 100 may transmit the state information after checking the installation of an exclusive application.

The robot cleaner 100 may transmit related information together with the state information. The information transmitted to the mobile terminal 200 may, for example, include an error code indicating an error of the robot cleaner 100, a version of firmware installed in the robot cleaner 100, a current time set in the robot cleaner, an amount of collected dust in the dust bin, a used amount of the filter, a charging amount of the battery, a state of the robot cleaner in a cleaning state, a state of the robot cleaner in a standby state, a state of the robot cleaner in a charging state, and the like.

The mobile terminal 200 is configured to display, in operation S780, an information providing screen based on the received state information and the corresponding information received together with the state information. In this example, the displayed screen may include appropriate and suitable information corresponding to the detected state and the received information. More detailed embodiments will be described below, taken in conjunction with FIGS. 8 to 18.

Figure 8:
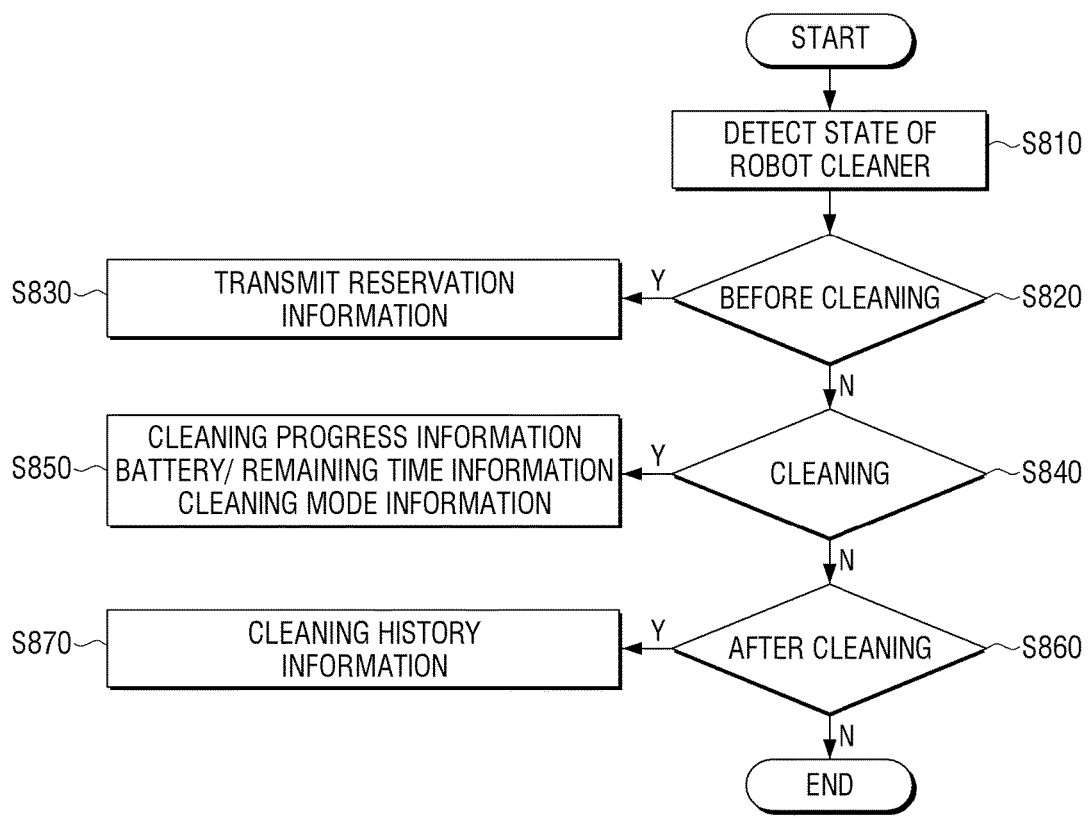
FIG. 8 illustrates a method for providing information of a robot cleaner according to a first embodiment.

FIG. 8 is a flowchart illustrating an information providing method of a robot cleaner according to a first example embodiment.

Referring to FIG. 8, a state of the robot cleaner is detected, in operation S810.

It is determined, in operation S820, whether the detected state of the robot cleaner is in the state of before cleaning. In response to determining that the robot cleaner is in the state of before cleaning, yes in operation S820, the robot cleaner is configured to transmit, in operation S830, reservation information of cleaning set in the robot cleaner to a mobile terminal. If no reservation information is set, the robot cleaner may transmit information to request reservation.

In response to determining that the robot cleaner is not in the state of before cleaning, no in operation S820, it is determined, in operation S840, as to whether the robot cleaner is in the state of cleaning. In response to determining that the robot cleaner is in the state of cleaning, yes in S840, the robot cleaner may transmit, in operation S850, a cleaning progress information indicating a progress of cleaning, a battery charging state or information on remaining time for which the robot cleaner may perform cleaning, cleaning mode information, and the like, to the mobile terminal.

In response to determining that the robot cleaner is not in the state of cleaning, no in operation S840, it is determined, in operation S860, whether the robot cleaner is in the state of after cleaning. In response to determining that the robot cleaner is in the state of after cleaning, yes in operation S860, the robot cleaner may transmit, in operation S870, cleaning history information including an area, time, cleaning mode in which cleaning was performed, or the like, to the mobile terminal.

In the case where the robot cleaner is in an initial state which has no history of cleaning, no in operation S860, the robot cleaner may transmit guide information, such as a user manual, to the mobile terminal.

Figure 9:
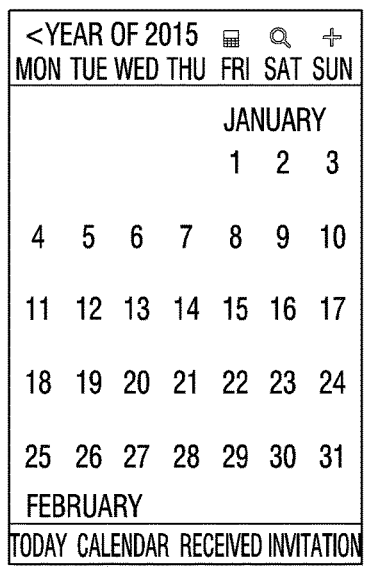
FIG. 9 illustrates a method for providing information of a robot cleaner according to a second embodiment.
Figure 9:
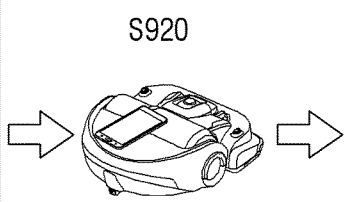
Figure 9:
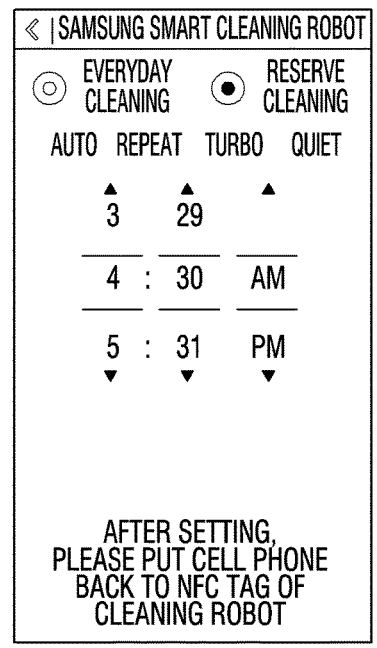
Figure 9:
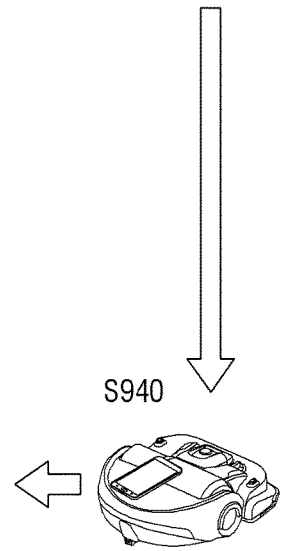
Figure 9:
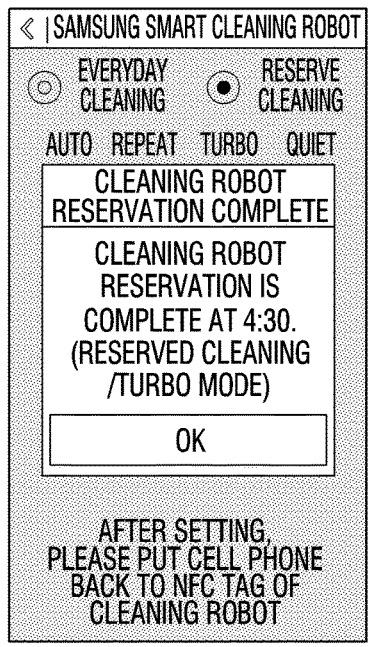

FIG. 9 is a view illustrating an information providing method of a robot cleaner according to a second example embodiment.

Referring to FIG. 9, schedule information of a user is preregistered, in operation S910, in a mobile terminal. The mobile terminal may determine that the user has not left the house from the schedule information of the user.

The user NFC-tags, in operation S920, the mobile terminal with the robot cleaner.

The mobile terminal, which is NFC-tagged with the robot cleaner, displays, in operation S930, a screen to reserve cleaning in the robot cleaner. The user may check the reservation information preset in the robot cleaner through the displayed screen. In addition, the user may change preset reservation information.

The user finalizes the changed reservation information or new cleaning reservation information and NFC-tags, in operation S940, the mobile terminal and the robot cleaner.

The mobile terminal may display, in operation S950, a screen showing that a cleaning reservation has been made without a problem in the robot cleaner.

Figure 10:
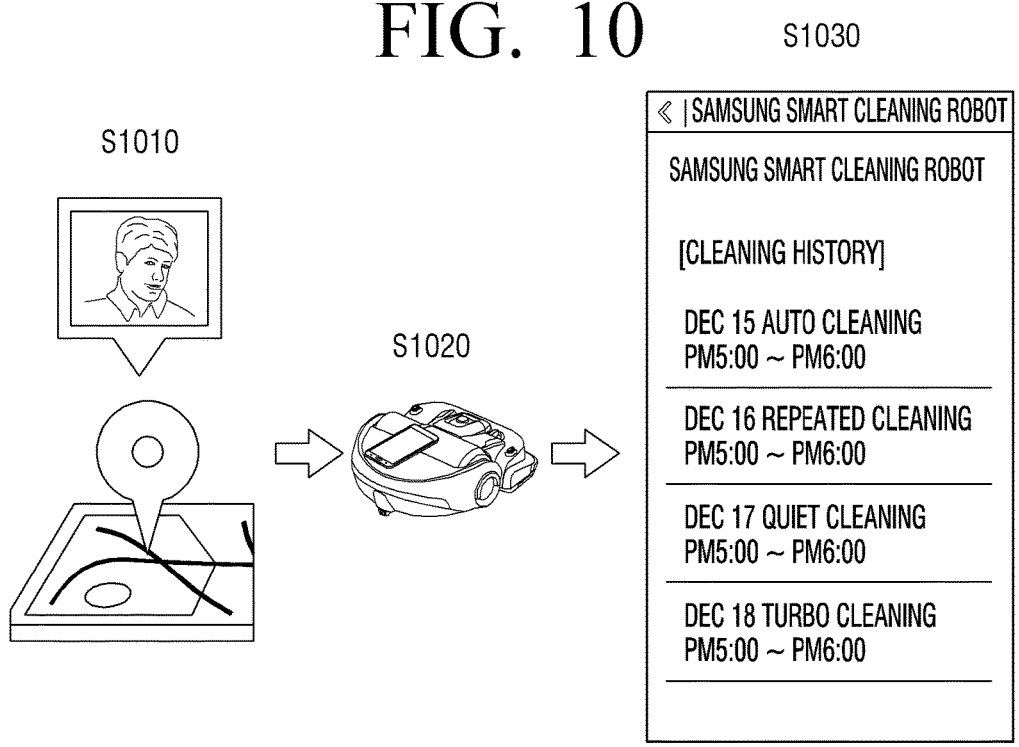
FIG. 10 illustrates a method for providing information of a robot cleaner according to the third embodiment.

FIG. 10 is a view illustrating an information providing method of a robot cleaner according to a third example embodiment.

Referring to FIG. 10, a mobile terminal is configured to determine, in operation S1010, that a user has returned home, using schedule information of the user, address information and measured position information of the user.

The user who has returned home NFC-tags, in operation S1020, the mobile terminal to the robot cleaner.

When NFC tagging is performed, the robot cleaner is configured to transmit details of cleaning performed when the user is outside home as history information to the mobile terminal, and the mobile terminal is configured to display, in operation S1030, a screen including the received history information.

Figure 11:
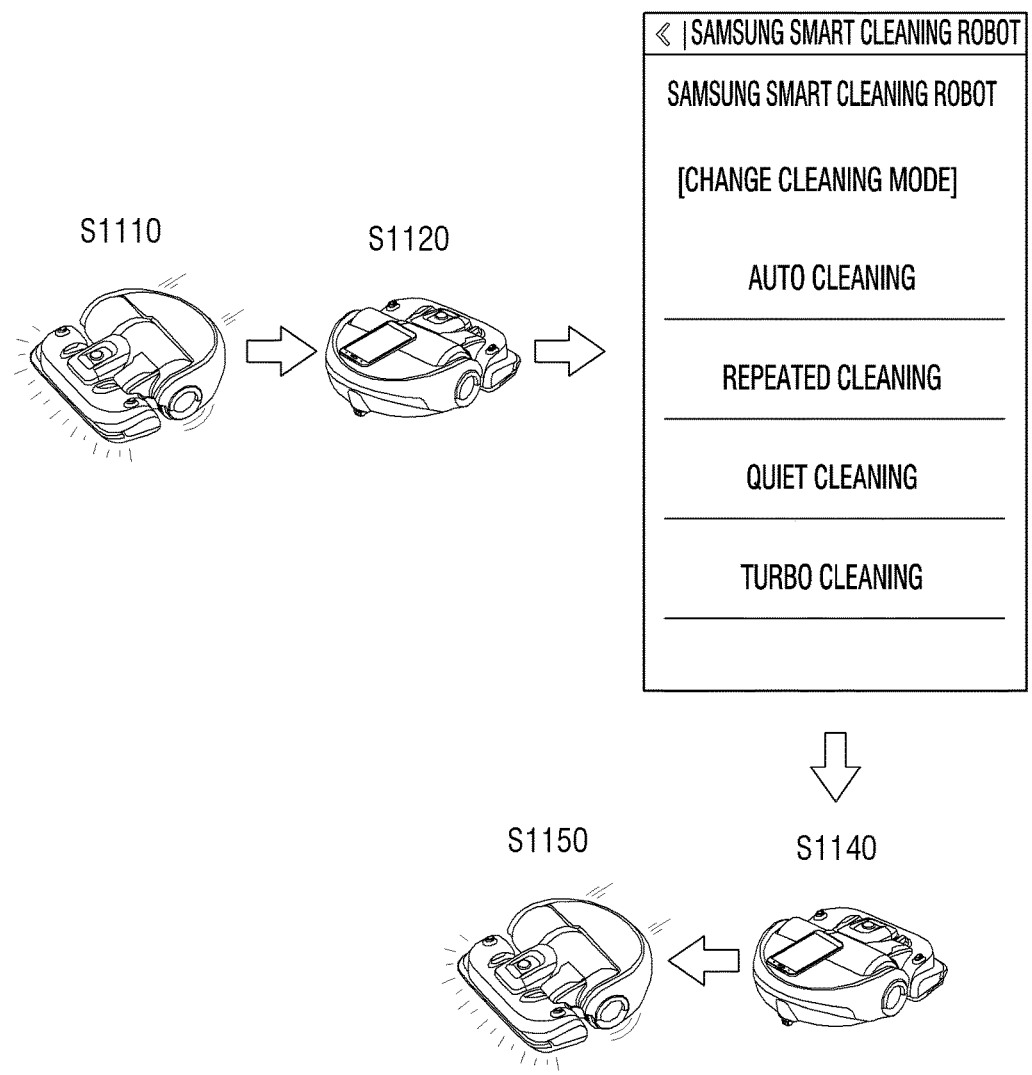
FIG. 11 illustrates a method for providing information of a robot cleaner according to a fourth embodiment.

FIG. 11 is a view illustrating an information providing method of a robot cleaner according to a fourth example embodiment.

Referring to FIG. 11, the robot cleaner is in the state of cleaning, in operation S1110.

A user NFC-tags, in operation S1120, a mobile terminal with the robot cleaner in the cleaning state.

The mobile terminal, which is NFC-tagged with the cleaning robot cleaner, displays, in operation S1130, a setting screen to change a cleaning mode of the robot cleaner. FIG. 11 only illustrates a screen to change a cleaning mode, but a screen to change other settings, such as a change of an area to be cleaned, may be further displayed.

The user selects a cleaning mode to be changed and NFC-tags, in operation S1140, the mobile terminal with the robot cleaner.

The robot cleaner, which has received information on a change of cleaning mode using NFC tagging, is configured to perform cleaning, in operation S1150, in the cleaning mode selected by the user.

Figure 12:
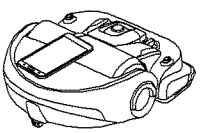
FIG. 12 illustrates a method for providing information of a robot cleaner according to a fifth embodiment.
Figure 12:
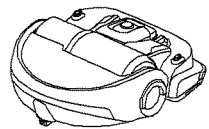
Figure 12:
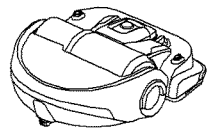
Figure 12:
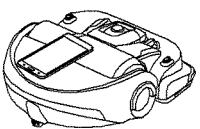
Figure 12:
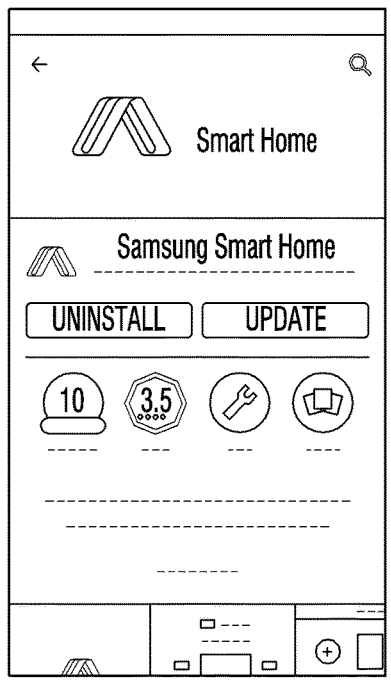

FIG. 12 is a view illustrating an information providing method of a robot cleaner according to a fifth example embodiment.

Referring to FIG. 12, a new firmware to be installed in the robot cleaner has been distributed. The robot cleaner may detect that a firmware needs to be updated. Alternatively, the mobile terminal may detect the presence of a new firmware and detect, in operation S1210, that a firmware of the robot cleaner needs to be updated.

The mobile terminal NFC-tags, in operation S1220, the robot cleaner. In this situation, information on a version of firmware installed in the robot cleaner is transmitted to the mobile terminal, and the mobile terminal may search whether a firmware of newer version is available.

The NFC-tagged mobile terminal, in response to detecting a firmware of newer version, displays, in operation S1230, a screen asking a user whether to update a firmware. Here, for stable installation of a firmware of the robot cleaner, the mobile terminal may display a message indicating that the robot cleaner must be in a charging state. The robot cleaner may automatically return to charging for updating of firmware.

The mobile terminal is configured to display, in operation S1240, an application screen for downloading a new firmware, to update a firmware. The user may start downloading a new firmware by touching an update button of the displayed screen.

The user is configured to NFC-tag, in operation S1250, the mobile terminal, which finished downloading the new firmware or is downloading the new firmware, with the robot cleaner. The NFC-tagged mobile terminal transmits the downloaded new firmware data to the robot cleaner.

When a transmission of all data of the new firmware is complete via a near field wireless communication, the robot cleaner updates a firmware, in operation S1260.

Figure 13:
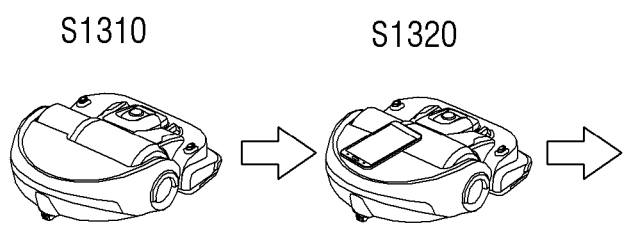
FIG. 13 illustrates a method for providing information of a robot cleaner according to a sixth embodiment.
Figure 13:
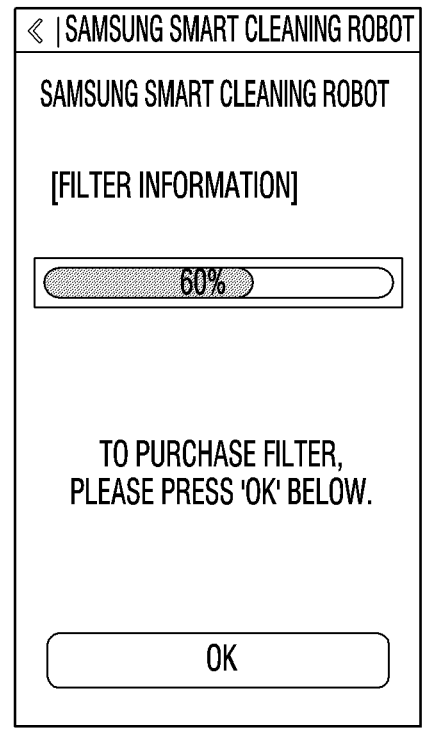

FIG. 13 is a view illustrating an information providing method for a robot cleaner according to a sixth example embodiment.

Referring to FIG. 13, the robot cleaner may be configured to determine, in operation S1310, a state of a component that is consumed or needs replacement, based on a cleaning time, an amount of dust, a cleaning mode, or the like. For example, as for the robot cleaner, a cleaning brush of an inlet, a filter for filtering dust, a rechargeable battery, or the like, correspond to a component that needs replacement or inspection.

A mobile terminal NFC-tags the robot cleaner, in operation S1320. The NFC-tagged mobile terminal receives information on component usage state from the robot cleaner.

The mobile terminal is configured to display, in operation S1330, a state of a component that needs replacement or inspection on a screen based on the state information received from the robot cleaner. In this situation, in the case of a component that needs replacement, the mobile terminal may further display information on a vendor of the component and a button linking to a website that sells the component, along with a remaining life.

Figure 14:
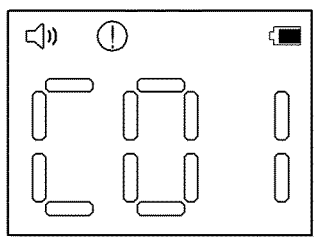
FIG. 14 illustrates a method for providing information of a robot cleaner according to a seventh embodiment.
Figure 14:
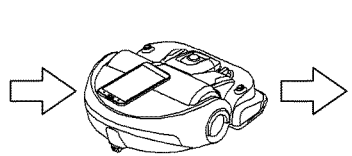

FIG. 14 is a view illustrating an information providing method of a robot cleaner according to a seventh example embodiment.

Referring to FIG. 14, the robot cleaner is configured to detect an error state, in operation S1410. In this example, the robot cleaner may display an icon indicating an error has occurred in a display of the robot cleaner and an error code indicating a type of the error. In addition, the robot cleaner may output a sound that informs an occurrence of the error.

A user NFC-tags, in operation S1420, the mobile terminal with the robot cleaner where the error has occurred. The NFC-tagged mobile terminal receives information on error state from the robot cleaner. According to an embodiment, the robot cleaner may transmit address information of a webpage which provides customer support information, such as how to deal with errors, to the mobile terminal.

The mobile terminal is configured to display, in operation S1430, information for dealing with the received error state information on a screen. According to an embodiment, the mobile terminal may automatically execute a web browser application and access the received web page address. The mobile terminal may further display a button providing information on other error states or a button reporting the errors to the manufacturer or the A/S center.

Figure 15:
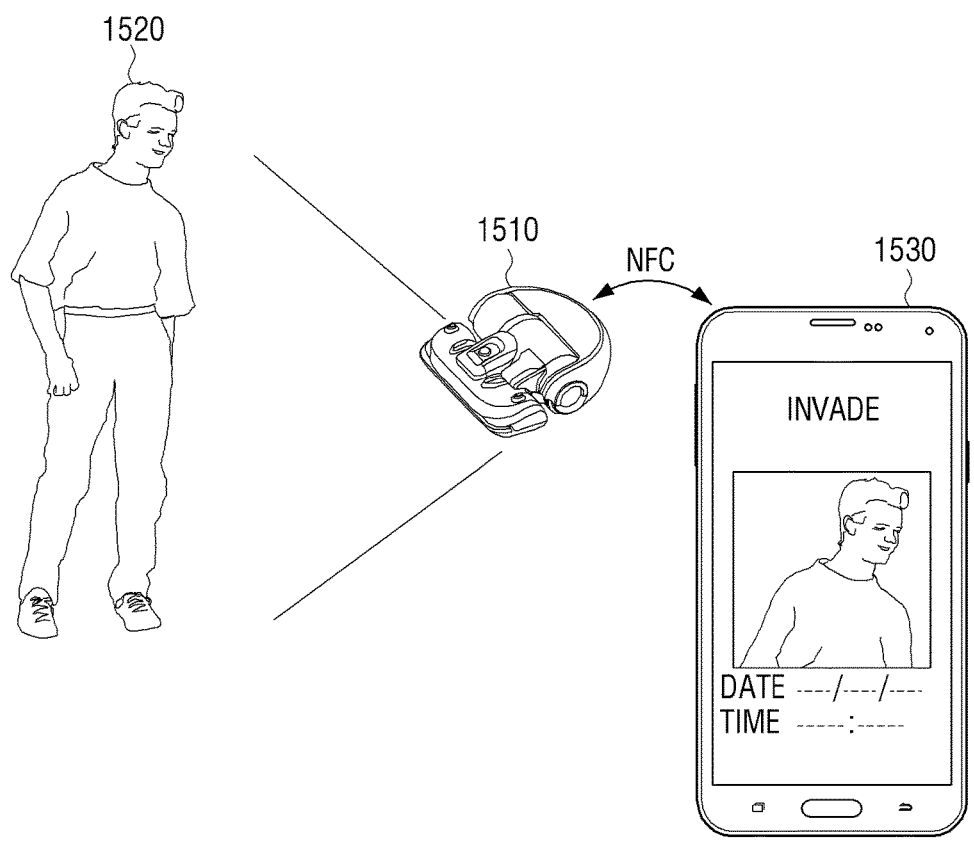
FIG. 15 illustrates a method for providing information of a robot cleaner according to an eighth embodiment.

FIG. 15 is a view illustrating an information providing method of a robot cleaner according to an eighth example embodiment.

Referring to FIG. 15, a robot cleaner 1510 is configured to detect a person 1520. Specifically, the robot cleaner 1510 may detect the person 1520 ahead via a human body sensing sensor included in the front surface of the robot cleaner 1510.

The robot cleaner 1510 may be configured to determine whether a user has left the house. Specifically, the robot cleaner 1510 may determine that the user has left the house, based on the mobile terminal, user schedule information received from a home server connecting at least one home appliance, or user position information, and the like. Alternatively, the robot cleaner 1510 may receive input of setting a monitoring functionality from the user.

The robot cleaner 1510 may photograph the person 1520 by using a camera that photographs the front side. Specifically, the robot cleaner 1510 may, when the person 1520 is detected in the human body sensing sensor, photograph the person ahead. In this example, the robot cleaner 1510 may activate the camera when the user has left the house. Alternatively, the robot cleaner 1510 may activate the camera when the monitoring functionality is set.

After returning home, the user NFC-tags a mobile terminal 1530 with the robot cleaner 1510. The mobile terminal 1530 is configured to receive information, such as photographed image data and photographing time, from the robot cleaner 1510. In addition, the mobile terminal 1530 may display the received image and time on a display.

Figure 16:
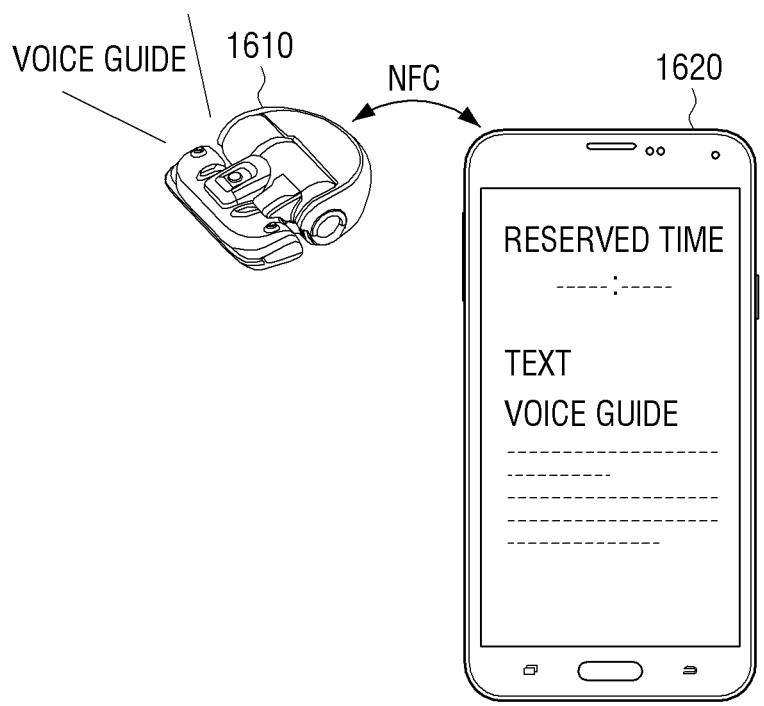
FIG. 16 illustrates a method for providing information of a robot cleaner according to a ninth embodiment.

FIG. 16 is a view illustrating an information providing method of a robot cleaner according to a ninth example embodiment.

Referring to FIG. 16, a robot cleaner 1610 has a speaker which outputs sound. In addition, a user inputs a text of a voice to be output from the robot cleaner 1610 and outputting time, to a mobile terminal 1620. Alternatively, the user may record a voice to be output from the robot cleaner 161 through a microphone of the mobile terminal 1620.

The user NFC-tags the mobile terminal 1620 with the robot cleaner 1610. The mobile terminal 1620 transmits time information input by the user and text information to the robot cleaner 1610 via a near field wireless communication. Alternatively, the mobile terminal 1620 may transmit recorded user voice data to the robot cleaner 1610.

The robot cleaner 1610 may convert text input at a reserved time to a voice and output the voice. Alternatively, the robot cleaner 1610 may output recorded voice data at a reserved time.

Figure 17:
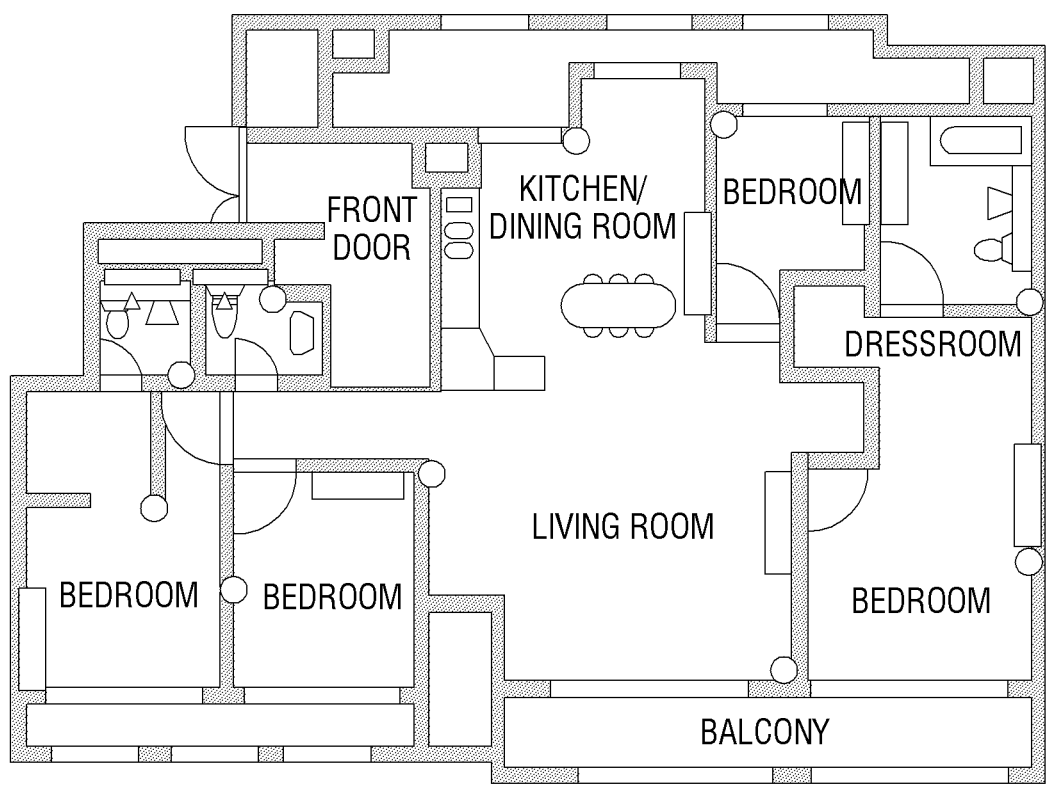
FIGS. 17 and 18 illustrate methods for providing information of a robot cleaner according to a tenth embodiment.
Figure 18:
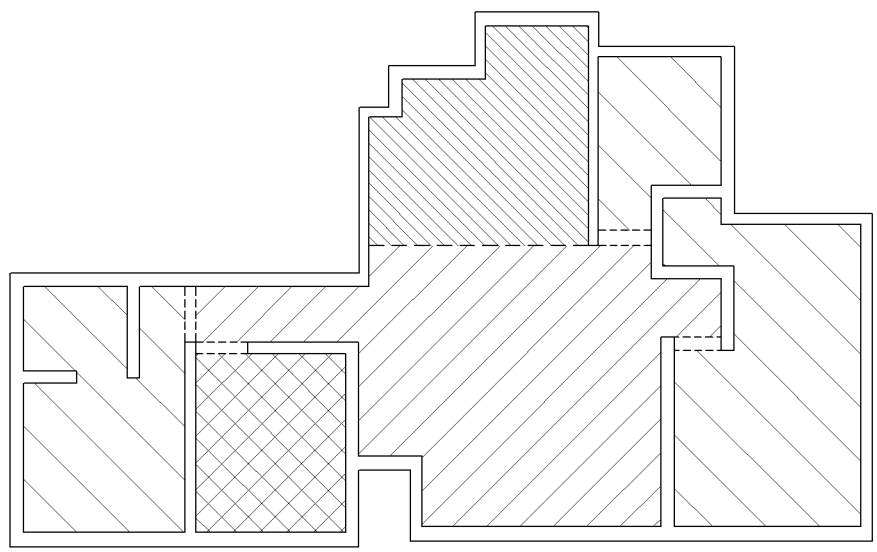

FIGS. 17 and 18 are views illustrating information providing a method of a robot cleaner according to a tenth example embodiment.

Referring to FIG. 17, the robot cleaner is disposed in a space having an interior of the planar view illustrated in FIG. 17. The robot cleaner photographs the ceiling, and runs the interior floor as it determines a position of the robot cleaner with reference to a light of the photographed ceiling.

The robot cleaner moves by searching for a space where the robot cleaner can be run, using an obstacle sensor, a camera, and the like.

The robot cleaner tracks a position of the robot cleaner as it runs the floor, and generates a map of the interior space. An example of generated map is as illustrated in FIG. 18. Specifically, the planar view of FIG. 18 excludes areas such as a balcony, front door, or bathroom areas which a robot cleaner cannot enter, from the planar view of FIG. 17.

According to another embodiment, a user may photograph an interior space, and generate a map of an interior space where the robot cleaner is disposed from the photographed image data, using a camera included in a mobile terminal.

The robot cleaner, when NFC-tagged, transmits the map information generated by the robot cleaner to the tagged mobile terminal.

The transmitted map information may be visually displayed on the mobile terminal. As an example embodiment, the transmitted map information may be displayed on the mobile terminal and receive input of setting an area to be cleaned by the robot cleaner. According to another example embodiment, the mobile terminal may further receive history information that the robot cleaner performed cleaning and distinguishably display a cleaned area on the map. Further, when different cleaning is performed by areas, the mobile terminal may display areas on the map in a different manner. For example, the mobile terminal may fill an area corresponding to a cleaned room with a preset color and display the map. In addition, the mobile terminal may fill an area corresponding to a room where cleaning is performed twice, with color of higher brightness and display the map. An example embodiment of providing information by using a map is not limited to the aforementioned example, and a mobile terminal may distinguishably display an area where cleaning of different cleaning mode is performed, or distinguish an area cleaned and an area not cleaned. Alternatively, the mobile terminal may receive information on dust concentration of areas cleaned by the robot cleaner, and display an area of the map corresponding to each of the areas with a different color.

All of the elements constituting an example embodiment of the present disclosure were described to be combined into one or combined to be operated, but it is not limited thereto. That is, as long as it is within the scope of objective of the present disclosure, all of the aforementioned elements may be selectively combined into more than one to be operated. In addition, some or all of the elements may be respectively realized as one independent hardware, but some or all of the respective elements may be selectively combined and may be realized as a computer program having a program module that performs the some or all of the functions combined in one or a plurality of hardware.

Codes constituting the computer program and code segments will be understood by one of ordinary skill. The aforementioned computer program may be embodied as a program executable by a processor, and the program may be stored in a non-transitory computer readable medium.

A non-transitory computer readable medium refers to a computer readable medium that stores data. The aforementioned various applications or programs may be stored in a non-transitory computer readable medium such as a CD, a DVD, a hard disk, a Blu-ray disk, a USB stick, a memory card, and a ROM, or the like.

Although the present disclosure has been described with one or more example embodiments, various changes and modifications may be suggested to one skilled in the art. It is intended that the present disclosure encompass such changes and modifications as fall within the scope of the appended claims.

What is claimed is:

1. A robot cleaner, comprising:
   a communication unit configured to communicate with a mobile terminal using a near field wireless communication (NFC); and
   a processor configured to detect a state of the robot cleaner among a plurality of predefined states, and in response to an NFC tagging being performed with the mobile terminal, control the communication unit to transmit information comprising the detected state to the mobile terminal,
   wherein the plurality of predefined states comprises at least one of a standby state, a cleaning state, a state in which a battery is being charged, a state in which a component needs to be replaced, or an error state.

2. The robot cleaner as claimed in claim 1, wherein the processor is configured to control the communication unit to transmit information regarding an application exclusive for the robot cleaner to the mobile terminal.

3. The robot cleaner as claimed in claim 1, wherein the processor is configured to update its firmware using a new firmware received from the mobile terminal.

4. The robot cleaner as claimed in claim 1, wherein the processor is configured to control the communication unit to transmit, to the mobile terminal, at least one of state information of a dust bin that collects dust, state information of a dust filter, or state information of a battery charge.

5. The robot cleaner as claimed in claim 1, wherein the processor is configured to control the communication unit to transmit, to the mobile terminal, address information of a webpage providing customer support information regarding errors in the robot cleaner.

6. The robot cleaner as claimed in claim 1, wherein the processor is configured to control the communication unit to transmit, to the mobile terminal, different information according to information received from the mobile terminal.

7. The robot cleaner as claimed in claim 6, wherein the processor is configured to, in response to receiving information indicating that a user of the mobile terminal has not yet left a house, control the communication unit to transmit information regarding a cleaning reservation set in the robot cleaner to the mobile terminal, and in response to receiving information indicating that the user of the mobile terminal has returned home, control the communication unit to transmit information regarding a cleaning history to the mobile terminal.

8. The robot cleaner as claimed in claim 1, further comprising:
   a dust sensor configured to detect a concentration of dust in a cleaned space,
   wherein the processor is configured to control the communication unit to transmit, to the mobile terminal, information regarding a concentration of dust in the cleaned space.

9. An information providing system, comprising:
   a robot cleaner having a near field communication (NFC) module; and
   a mobile terminal configured to communicate with the robot cleaner using a near field wireless communication by NFC-tagging the robot cleaner, wherein the robot cleaner is configured to detect a state of the robot cleaner among a plurality of predefined states, and wherein the mobile terminal is configured to display a screen which provides information corresponding to the detected state of the robot cleaner, wherein the plurality of predefined states comprises at least one of a standby state, a cleaning state, a state in which a battery is being charged, a state in which a component needs to be replaced or an error state.

10. The system as claimed in claim 9, wherein the mobile terminal is configured to:
determine whether a user has left a house based on location information positioning the mobile terminal,
in response to determining that the user has not yet left the house, display a reservation setting screen to reserve cleaning by the robot cleaner, and
in response to determining that the user has returned home, display information regarding history of cleaning performed by the robot cleaner.

11. The system as claimed in claim 10, wherein the mobile terminal is configured to display the reservation setting screen to designate an area to be cleaned and information regarding cleaning history which differs by area, using information regarding a map of an indoor area where the robot cleaner is disposed.

12. A method for providing information regarding a robot cleaner, the method comprising:
detecting a state of the robot cleaner among a plurality of predefined states; and
in response to a near field communication (NFC) tagging being performed with a mobile terminal, transmitting, to the mobile terminal, information corresponding to the detected state;
wherein the plurality of predefined states comprises at least one of a standby state, a cleaning state, a state in which a battery is being charged, a state in which a component needs to be replaced or an error state.

13. The method as claimed in claim 12, wherein the transmitting comprises transmitting to the mobile terminal information regarding an application exclusive for the robot cleaner.

14. The method as claimed in claim 12, further comprising:
receiving a new firmware from the mobile terminal; and
updating a firmware installed in the robot cleaner to the received new firmware.

15. The method as claimed in claim 12, wherein the transmitting comprises transmitting at least one of state information of a dust bin, state information of a filter for filtering dust, or state information of battery charging.

16. The method as claimed in claim 12, wherein the transmitting comprises transmitting address information of a webpage that provides customer support information regarding errors in the robot cleaner.

17. The method as claimed in claim 12, wherein the transmitting comprises transmitting different information according to information received from the mobile terminal.

18. The method as claimed in claim 17, wherein the transmitting comprises, in response to receiving information indicating that a user of the mobile terminal has not yet left a house, transmitting information regarding a cleaning reservation set in the robot cleaner, and in response to receiving information indicating that the user of the mobile terminal has returned to the house, transmitting information regarding cleaning history.

19. The method as claimed in claim 12, further comprising:
detecting a concentration of collected dust,
wherein the transmitting comprises transmitting information regarding a concentration of dust in an area cleaned.

20. The method as claimed in claim 12, further comprising:
detecting a charge state of a battery of the robot cleaner; and
in response to detecting that the charge state of the battery is low, automatically returning the robot cleaner to a charging position.

* * * * *